(12) United States Patent
Allerellie

(10) Patent No.: US 6,744,962 B2
(45) Date of Patent: Jun. 1, 2004

(54) FIBEROPTIC SPLICE CLOSURE

(75) Inventor: Michael Wayne Allerellie, Wadesville, IN (US)

(73) Assignee: Uniseal, Inc., Evansville, IN (US)

( * ) Notice: Subject to any disclaimer, the term of this patent is extended or adjusted under 35 U.S.C. 154(b) by 0 days.

(21) Appl. No.: 10/268,858

(22) Filed: Oct. 10, 2002

(65) Prior Publication Data

US 2003/0091315 A1 May 15, 2003

Related U.S. Application Data

(60) Provisional application No. 60/352,010, filed on Oct. 25, 2001.

(51) Int. Cl.[7] ................................................. G02B 6/00
(52) U.S. Cl. ......................................................... 385/135
(58) Field of Search ................................. 385/135, 134, 385/147, 53, 137, 138

(56) References Cited

U.S. PATENT DOCUMENTS

| | | |
|---|---|---|
| 3,337,681 A | 8/1967 | Smith |
| 3,692,926 A | 9/1972 | Smith |
| 4,117,259 A | 9/1978 | Giebel et al. |
| 4,679,896 A | 7/1987 | Krafcik et al. |
| 4,704,499 A | 11/1987 | Faust |
| 4,742,181 A | 5/1988 | Dienes |
| 4,770,491 A | 9/1988 | Champa et al. |
| 4,799,757 A | 1/1989 | Goetter |
| 4,988,834 A | 1/1991 | Birch |
| 5,136,121 A | 8/1992 | Kluska et al. |
| 5,450,518 A | 9/1995 | Burek et al. |
| 5,481,640 A | 1/1996 | Harman et al. |
| 5,491,766 A | 2/1996 | Huynh et al. |
| 5,515,472 A | 5/1996 | Mullaney et al. |
| 5,525,756 A | 6/1996 | Mullaney et al. |
| 5,528,718 A | 6/1996 | Ray et al. |
| D372,897 S | 8/1996 | Curry et al. |
| 5,602,954 A | 2/1997 | Nolf et al. |
| 5,631,993 A | 5/1997 | Cloud et al. |
| 5,644,671 A | 7/1997 | Goetter et al. |
| 5,655,044 A | 8/1997 | Finzel et al. |
| 5,657,413 A | 8/1997 | Ray et al. |
| 5,689,606 A | 11/1997 | Hassan |
| 5,692,299 A | 12/1997 | Daems et al. |
| 5,740,298 A | 4/1998 | Macken et al. |
| 5,764,843 A | 6/1998 | Macken et al. |
| 5,764,844 A | 6/1998 | Mendes |
| 5,777,268 A | 7/1998 | Allen et al. |
| 5,789,707 A | 8/1998 | Damm et al. |
| 5,790,740 A | 8/1998 | Cloud et al. |
| 5,793,921 A | 8/1998 | Wilkins et al. |
| 5,825,964 A | 10/1998 | Goetter et al. |

(List continued on next page.)

FOREIGN PATENT DOCUMENTS

| | | |
|---|---|---|
| FR | 2694642 A | 2/1994 |
| JP | 11248946 A | 9/1999 |
| WO | WO 9702504 A | 1/1997 |

OTHER PUBLICATIONS

Raychem Telecommunications Product Directory, Undated 1966.

Siecor—Advanced Splice Closures, SCF–6C Fiber Family, May, 1999.

Preformed Line Products, Coyote Product Series, Fiber Optic Catalog, Mar. 1998.

Primary Examiner—Javaid H. Nasri
(74) Attorney, Agent, or Firm—Barnes & Thornburg

(57) ABSTRACT

A fiberoptic splice closure comprises a first component having a sealing surface, a second component having an abutting sealing surface and at least one substantially planar splice tray configured to be removably coupled to the first component such that the splice tray extends substantially perpendicular to the sealing surface of the first component. The fiberoptic closure is configured to store the slack fibers around the perimeter of the splice tray.

54 Claims, 6 Drawing Sheets

U.S. PATENT DOCUMENTS

| | | |
|---|---|---|
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,911,027 A | 6/1999 | Macken et al. |
| 6,014,490 A | 1/2000 | Canning et al. |
| 6,044,193 A | 3/2000 | Szentesi et al. |
| 6,215,939 B1 | 4/2001 | Cloud |
| 6,292,614 B1 | 9/2001 | Smith et al. |

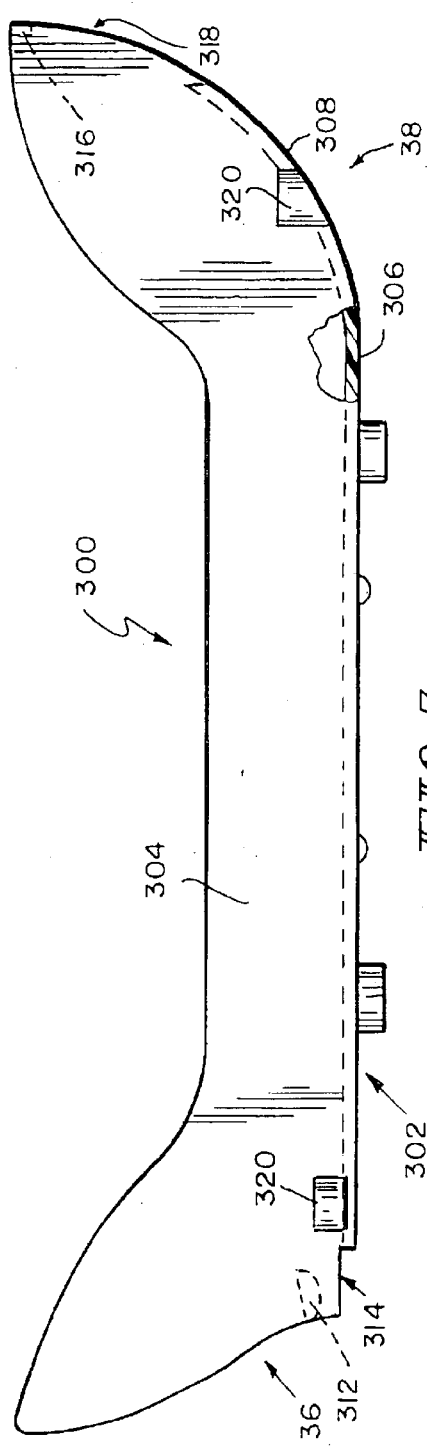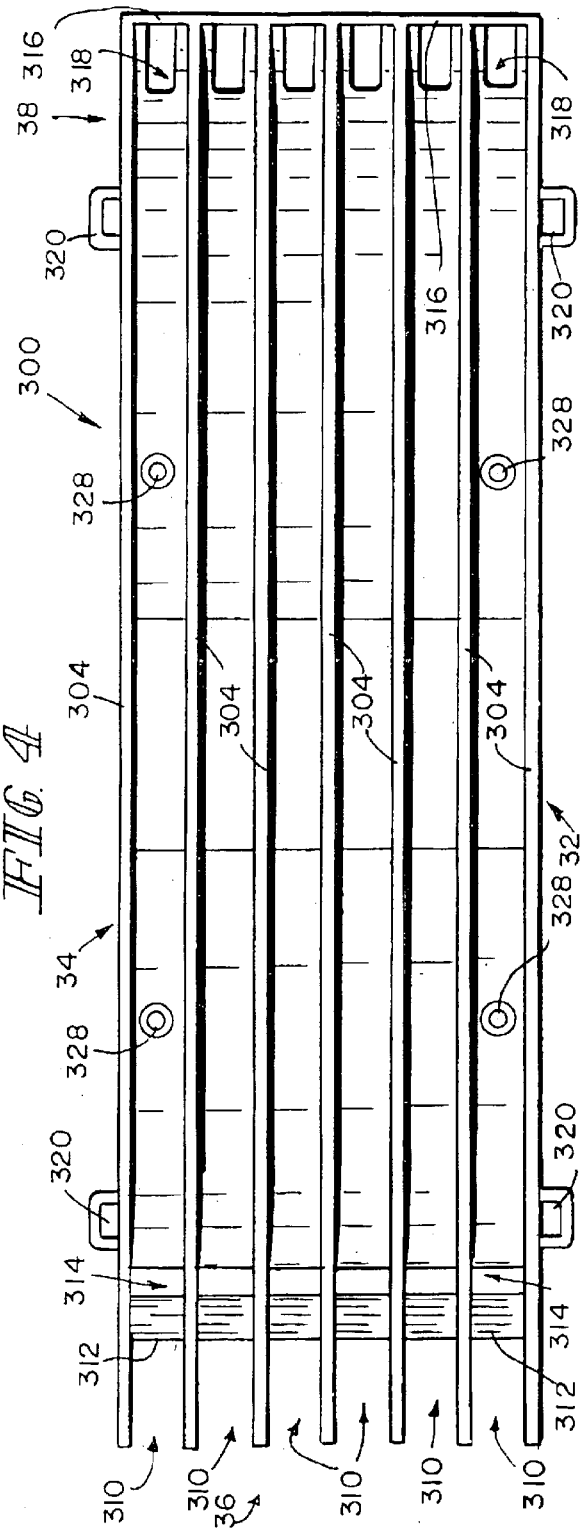

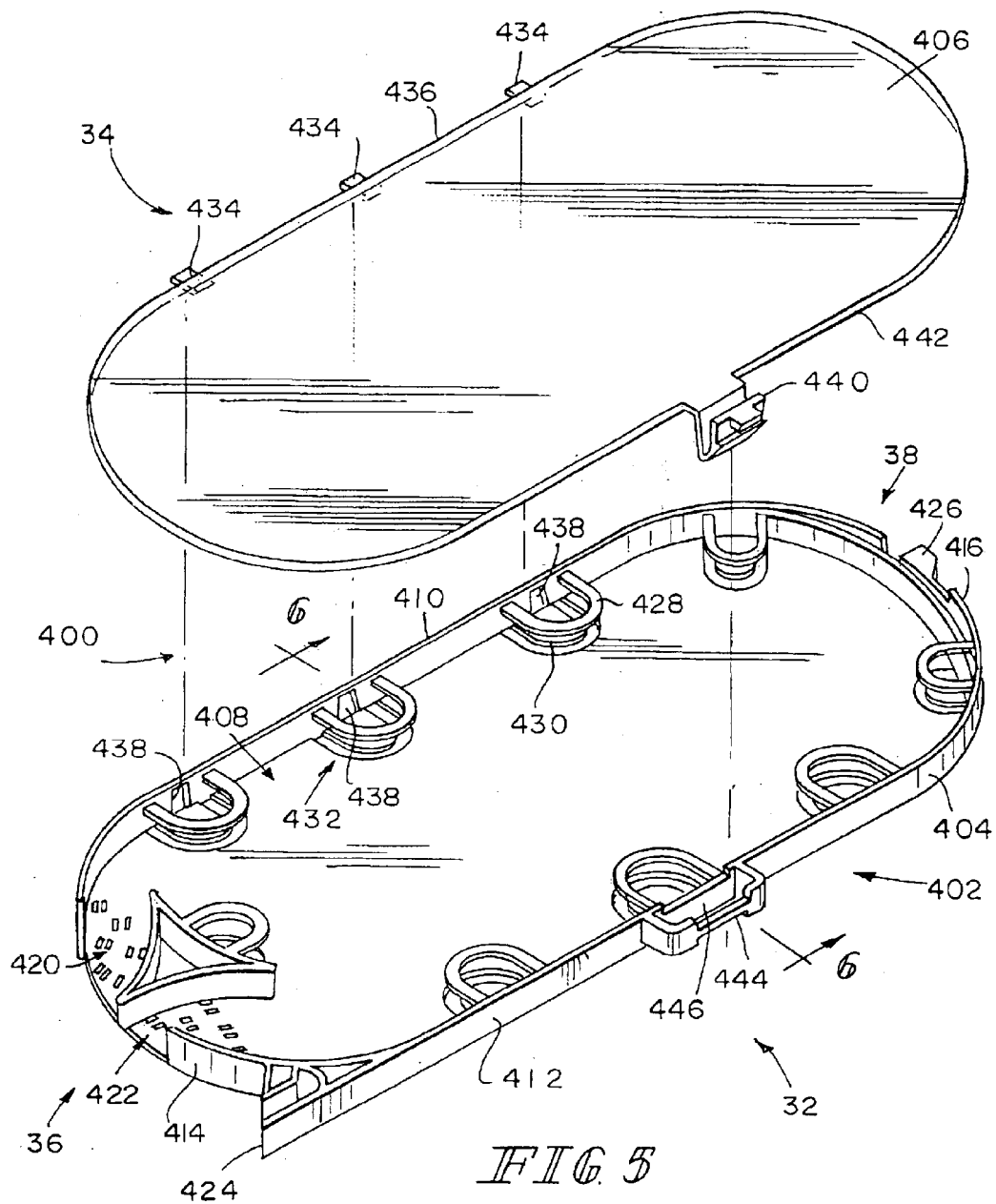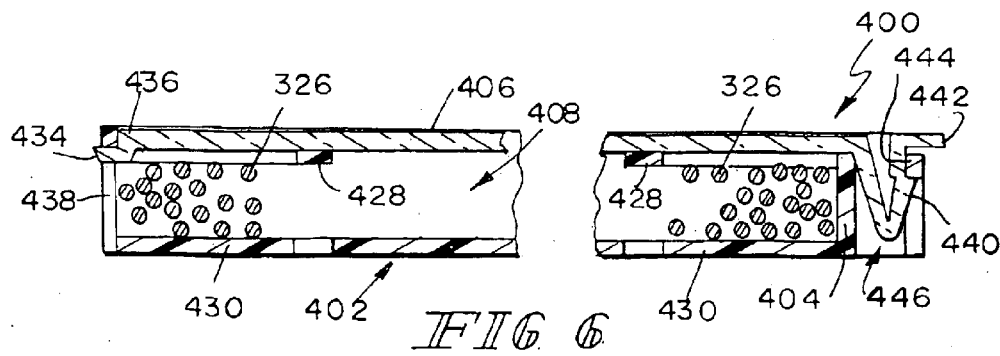

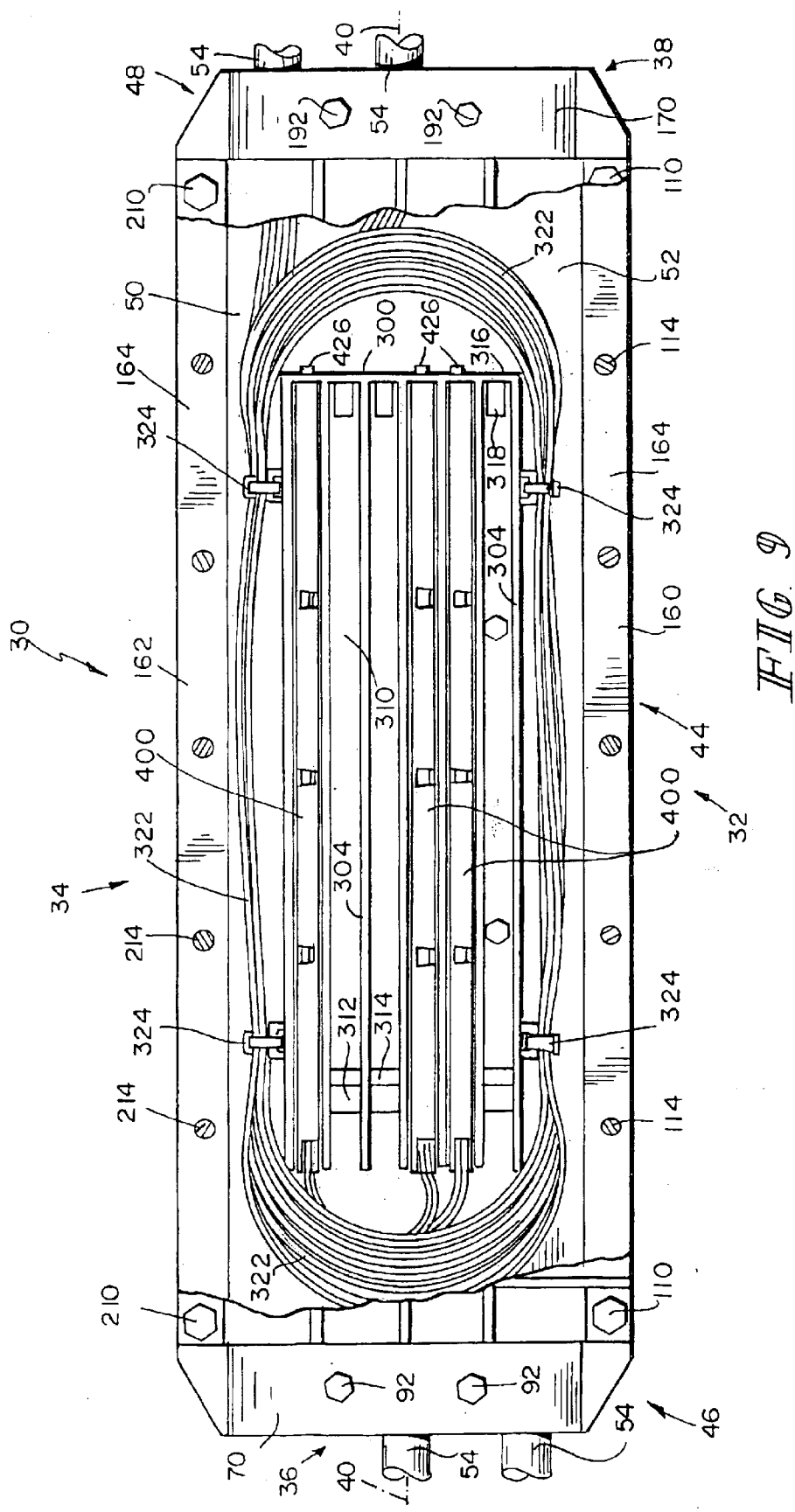

FIBEROPTIC SPLICE CLOSURE

CROSS-REFERENCES TO RELATED APPLICATIONS

This application claims the benefit of U.S. Provisional Patent Application, Serial No. 60/352,010, filed on Oct. 25, 2001, and entitled "FIBEROPTIC SPLICE CLOSURE".

BACKGROUND AND SUMMARY OF INVENTION

This invention generally relates to a fiberoptic splice closure for protecting fiberoptic cable splices, and more particularly to a fiberoptic splice closure having improved fiber management system.

The telecommunications industry utilizes fiberoptic trunk cables (0.125 to 1.250 inches in diameter) having numerous individual fiber-optic strands or fibers (e.g., up to 1,000 fibers to a cable). When the communications cables are strung or laid, it is often necessary to splice sections of these cables having multiple fibers. The communication cables sometimes get damaged during their use due to a variety of factors, such as high wind, storm, snow, etc. Also, fibers are very delicate (e.g, 8 to 11 microns in diameter for single mode), and are prone to damage. When they are damaged, it is necessary to splice together the damaged sections of these cables. Typically, a plurality of splices (e.g., 60) are enclosed in a splice tray, and a plurality of splice trays (e.g., 6) are enclosed in a splice closure.

A splice closure must also provide space for slack fibers. Ninety eight inches of slack fibers are required to meet the Bellcore Lab's GR-771-CORE specification. The slack fibers are required in case of a bad splice or if damage would occur to the closure and/or splices. Once the splice is made and lines are strung on telephone poles for miles, there is no way of getting extra cable. Therefore, enough slack fibers are provided at the outset to meet all future needs.

The prior art is replete with various types of fiberoptic closures. Some examples of the prior art fiberoptic closures are disclosed in U.S. Pat. Nos. 5,644,671 and 6,292,614B1. The prior art closures suffer from various drawbacks. For example, the slack fibers in some splice closures are stowed under the splice trays. Therefore, all the splice trays have to be removed when the technician needs to access the slack fibers under the trays for maintenance. In some closures, the splice trays are stacked horizontally on top of each other in a vertical stack. In these types of closures, the top trays must be removed to gain access to the bottom trays. Thus, all the trays in the stack must be removed in order to perform maintenance on a single splice located in the bottom tray.

According to the present invention, the splice closure includes a top cover, a bottom cover and at least one vertical splice tray removably coupled to the bottom cover. According to another feature of the invention, the slack fibers in the closure are stored around the perimeter of the at least one splice tray.

An illustrative fiberoptic closure comprises a first component having a sealing surface, a second component having an abutting sealing surface and a plurality of substantially planar splice trays configured to be removably coupled to the first component such that the splice trays extend substantially perpendicular to the sealing surface of the first component. The fiberoptic closure is configured to store slack fibers around the perimeter of the splice trays.

According to another feature of the present invention, a splice closure includes a top cover, a bottom cover and at least one end plate. The at least one end plate includes a first end plate portion, a second end plate portion and a third end plate portion. The first end plate portion is integrally formed with the bottom cover. A first securing means is configured to secure the second end plate portion to the first end plate portion to define at least one cable entry port. A second securing means separate from the first securing means is configured to secure the third end plate portion to the first and second end plate portions to define at least one cable entry port.

Additional features of the present invention will become apparent to those skilled in the art upon a consideration of the following detailed description of the following embodiments exemplifying the best mode of carrying out the invention as presently perceived.

BRIEF DESCRIPTION OF DRAWINGS

The detailed description particularly refers to the accompanying drawings in which:

FIG. 3 is a front elevational view of the tray holder, and showing the bottom wall and the side walls, FIG. 4 is a top view of the tray holder, and showing the laterally spaced-apart sidewalls forming the tray-receiving spaces, FIG. 5 is an exploded perspective view of a splice tray, and showing a base having a perimetral wall, a lid configured to be releasably secured to the perimetral wall, a plurality of retention tabs, two inlet ports and a catch at one end and a flexible finger at the other end, FIG. 6 is a sectional view of the splice tray along the line 6—6 in FIG. 5, and showing a latch for releasably securing the lid to the base, FIG. 9 is a top view of an assembled splice closure with the top cover removed, and showing the tray holder secured to the bottom wall, a plurality of splice trays inserted into the tray holder, fiberoptic cables entering the spice closure—two at each end, and slack fibers organized around the tray holder, and FIG. 10 is a perspective view showing a fiberoptic cable having an end section thereof wrapped with a sizing tape.

DETAILED DESCRIPTION OF DRAWINGS

Figure 1:
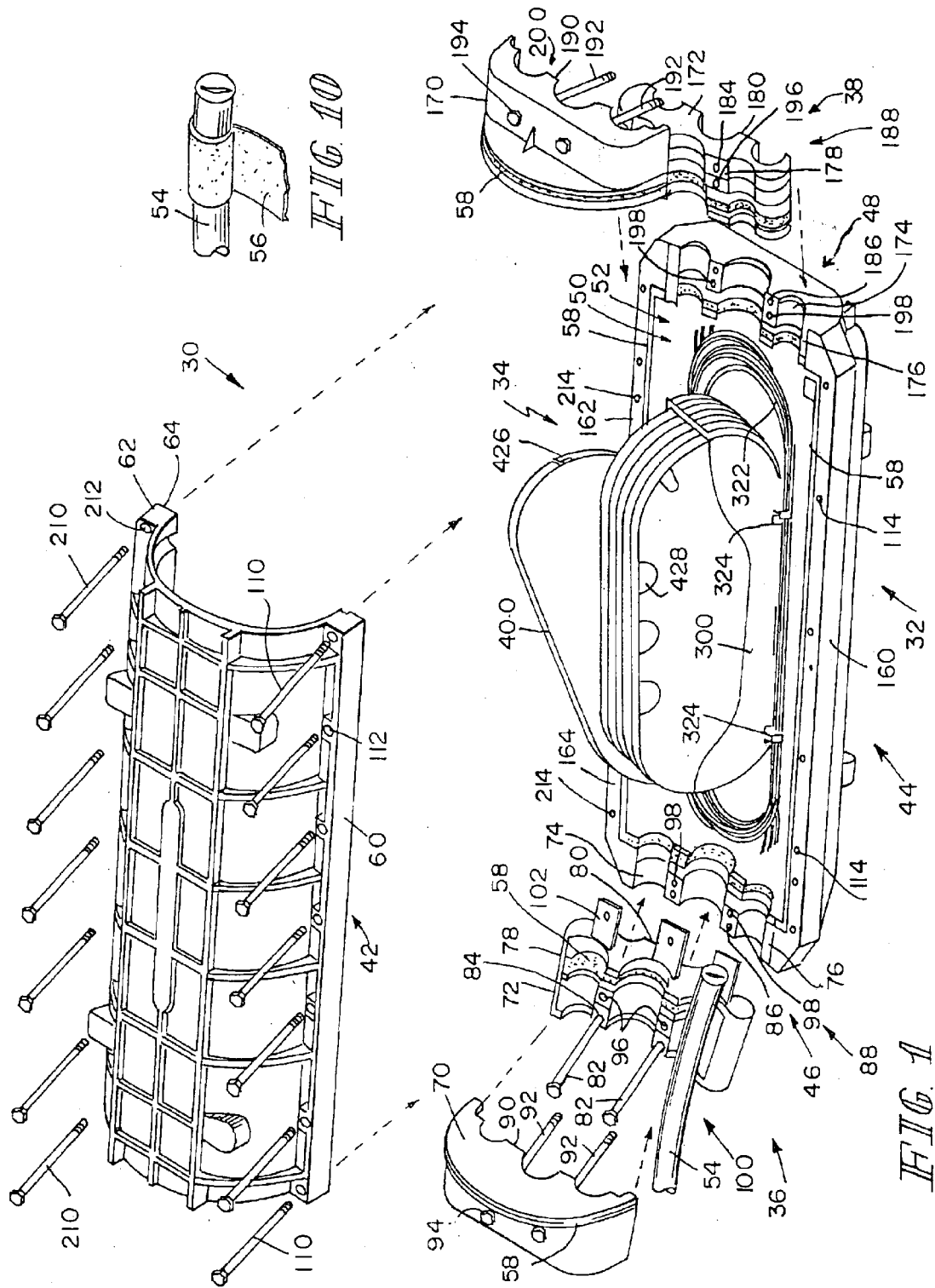
FIG. 1 is an exploded perspective view of a splice closure in accordance with the present invention, and showing a top cover, a bottom cover, a tray holder secured to the bottom cover, a plurality of vertical splice trays configured to be removably secured to the tray holder, an end cap at each end, six cable entrances formed in each end cap in two layers of three cable entrances in each layer and a plurality of sealing gaskets.

Referring to FIG. 1, an illustrative closure 30 has a front side 32, a rear side 34, a left end 36, a right end 38, and a longitudinal axis 40 (shown in FIG. 9). The closure 30 includes a top cover 42, a bottom cover 44, a three-piece left end plate or cap 46 and a three-piece right end plate or cap 48. A tray holder 300 is secured to the bottom cover 44. The tray holder 300 is sometimes referred to as the tray sleigh or tray caddy. A plurality of splice trays 400 are removably received in the tray holder 300 such that the splice trays 400 extend longitudinally and vertically from the bottom cover 44 in a side-by-side relationship. Space 50 is provided around the perimeter of the tray holder 300 and the splice trays 400 for storing slack fibers or slack ribbons 322.

As used in this description, the phrase "front or first side 32" will be used to denote the side of any referred-to object that is positioned to lie nearest the front side 32 of the closure 30, and the phrase "rear or second side 34" will be used to denote the side of any referred-to object that is positioned to lie nearest the rear side 34 of the closure 30. Likewise, the phrase "left or first end 36" will be used to denote the end of any referred-to object that is positioned to lie nearest the left end 36 of the closure 30, and the phrase "right or second end 38" will be used to denote the end of any referred-to object that is positioned to lie nearest the right end 38 of the closure 30.

The top and bottom covers 42, 44 have a generally semicircular transverse cross-section. The front and rear edges of the top cover 42 are configured to form longitudinally-extending flanges 60, 62, and the front and rear edges of the bottom cover 44 are configured to form longitudinally-extending flanges 160, 162. The longitudinally-extending flanges 60, 62 of the top cover 42 define a downwardly-facing sealing surface 64, and the longitudinally-extending flanges 160, 162 of the bottom cover 44 define an upwardly-facing sealing surface 164. The top and bottom covers 42, 44 meet along their respective sealing surfaces 64, 164 (sometimes collectively referred to as a longitudinal split plane) to form an internal cavity 52 bounded by the end caps 46, 48.

The left and right end caps 46, 48 are mirror images of each other, and each have a generally circular cross-section. The left end cap 46 comprises top, middle and bottom end cap portions 70, 72, 74 (sometimes referred to as top, middle and bottom clamps). The bottom end cap portion 74 is integrally formed with the bottom cover 44, and includes an upwardly-facing sealing surface 76. The middle end cap portion 72 includes two opposed upwardly and downwardly-facing sealing surfaces 78, 80. Two bolts 82 extend through the oversized openings 84 in the middle end cap portion 72, and are threaded into the openings 86 in the bottom end cap portion 74 to secure the middle end cap portion 72 to the bottom end cap portion 74. The downwardly-facing sealing surface 80 of the middle end cap portion 72 and the upwardly-facing sealing surface 76 of the bottom end cap portion 74 are configured to form three cable entry ports or entrances 88 through which up to three fiberoptic cables 54 enter the interior cavity 52. Blank plugs (not shown) are used to close off unused cable entry ports 88. The top end cap portion 70 includes a downwardly-facing sealing surface 90. Two bolts 92 extend through the oversized openings 94 in the top end cap portion 70 and through the oversized openings 96 in the middle end cap portion 72, and are screwed into the openings 98 in the bottom end cap portion 74 to secure the top end cap portion 70 to the middle and bottom end cap portions 72, 74. The upwardly-facing sealing surface 78 of the middle end cap portion 72 and the downwardly-facing sealing surface 90 of the top end cap portion 70 are configured to form three additional cable entry ports or entrances 100. The sealing surfaces 76, 78, 80, 90 of the bottom, middle and top end cap portions 70, 72, 74 are all generally parallel to each other, and are parallel to the upwardly-facing sealing surface 164 of the bottom cover 44.

The right end cap 48 comprises top, middle and bottom end cap portions 170, 172, 174 (sometimes referred to as top, middle and bottom clamps). The bottom end cap portion 174 is integrally formed with the bottom cover 44, and includes an upwardly-facing sealing surface 176. The middle end cap portion 172 includes two opposed upwardly and downwardly-facing sealing surfaces 178, 180. Two bolts 182 extend through the oversized openings 184 in the middle end cap portion 172, and are threaded into the openings 186 in the bottom end cap portion 174 to secure the middle end cap portion 172 to the bottom end cap portion 174. The downwardly-facing sealing surface 180 of the middle end cap portion 172 and the upwardly-facing sealing surface 176 of the bottom end cap portion 174 are configured to form three cable entry ports or entrances 188 through which up to three fiberoptic cables 54 enter the interior cavity 52. Blank plugs (not shown) are used to close off unused cable entry ports 188. The top end cap portion 170 includes a downwardly-facing sealing surface 190. Two bolts 192 extend through the oversized openings 194 in the top end cap portion 170 and through the oversized openings 196 in the middle end cap portion 172, and are screwed into the openings 198 in the bottom end cap portion 174 to secure the top end cap portion 170 to the middle and bottom end cap portions 172, 174. The upwardly-facing sealing surface 178 of the middle end cap portion 172 and the downwardly-facing sealing surface 190 of the top end cap portion 170 are configured to form three additional cable entry ports or entrances 100. The sealing surfaces 176, 178, 180, 190 of the bottom, middle and top end cap portions 170, 172, 174 are all generally parallel to each other, and are parallel to the upwardly-facing sealing surface 164 of the bottom cover 44.

According to one aspect of the present invention, the cables 54 entering the closure 30 are clamped down in two steps. A first layer of three cables 54 is secured to the bottom cover 44 near the first end 36 by bolting down the middle end cap portion 72 to the bottom end cap portion 74. A second layer of three cables 54 is then secured to the bottom cover 44 by bolting down the top end cap portion 70 to the middle and bottom end cap portions 72, 74. Likewise, six cables 54 can be secured to the other end 38 of the closure 30 in two steps. This simplifies the task of clamping down the cables 54 entering the closure 30—up to six cables entering each end 36, 38 of the closure 30. In some prior art designs employing three-piece end caps, all the cables entering the closure through each end must be clamped down at one time.

The left top end cap portion 70 and a portion of the left middle end cap portion 72 are dimensioned and configured to fit inside the left end 36 of the top cover 42. The right top end cap portion 170 and a portion of the right middle end cap portion 172 are dimensioned and configured to fit inside the right end 38 of the top cover 42. A portion of the left middle end cap portion 72 is dimensioned and configured to fit inside the left end 36 of the bottom cover 44. A portion of the right middle end cap portion 172 is dimensioned and configured to fit inside the right end 38 of the bottom cover 44. Although the illustrated closure 30 is provided with six cable entrances 88, 100 and 188, 200 at each end 36, 38 thereof, the closure 30 may very well be designed to have a different number of cable entrances at each end 36, 38. For example, the closure 30 may have six cable entrances at one end and no cable entrances at the other end. Seven bolts 110 pass through the oversized apertures 112 in the front flange 60 of the top cover 42, and are screwed into openings 114 in the front flange 160 of the bottom cover 44. Seven bolts 210 pass through the oversized apertures 212 in the rear flange 62 of the top cover 42, and are threaded into the openings 214 in the rear flange 162 of the bottom cover 44. The two holes near the ends 36, 38 of the closure 30 are spaced closer together than the three holes in the middle of the closure 30. The two closely-spaced holes near the ends 36, 38 of the closure 30 ensure that the cables 54 entering the closure 30 (up to six cables 54 at each end 36, 38) are securely clamped so that the splices contained in the closure 30 are protected from longitudinal and transverse forces. Also, the closely-spaced holes near the ends 36, 38 of the closure 30 prevent axial slippage between the cables 54 and the closure 30.

As shown in FIG. 10, the end sections of the cables 54 are typically wrapped with a strip of sizing tape 56 to make the cables 54 fit tightly in the cable entrances 88, 100, 188, 200 without any gaps. Blank plugs (not shown) are used to close off unused cable entrances 88, 100, 188, 200. In the illustrated embodiment, the inside surfaces of the cable entrances 88, 100, 188, 200 are jagged or serrated (obscured). The jagged edges of the cable entrances 88, 100, 188, 200 are embedded in the sizing tape 56 wrapped around the cables 54 to form a tight seal between the cables 54 and the end caps 46, 48. Also, the jagged edges of the cable entrances 88, 100, 188, 200 prevent axial slippage between the cables 54 and the end caps 46, 48, which are firmly secured to the bottom cover 44 by the bolts 82, 92, 182, 192.

A gasket 58 may be placed between the longitudinally-extending flanges 60, 62, 160, 162 of the top and bottom covers 42, 44 to seal the longitudinal edges of the closure 30. Additional gaskets 58 are placed around the outer peripheral surfaces of the top end cap portions 70, 170 to seal the space between the outer peripheral surfaces of the top end cap portions 70, 170 and the inner peripheral surfaces of the top cover 42. In the illustrated embodiment, the flanges 60, 62, 160, 162 of the top and bottom covers 42, 44 and the outer peripheral surfaces of the top end cap portions 70, 170 are provided with longitudinal and circumferential sealing grooves. The gaskets 58 may be provided with complementary beads for reception in the longitudinal and circumferential sealing grooves in the top and bottom covers 42, 44 and the left and right top end cap portions 70, 170 to form a tight seal. The blank plugs (if any), the sizing tape 56 and the gaskets 58 serve to produce an air tight closure to protect the splices from the elements. The closure 30 may include an air valve (obscured view) to allow the closure 30 to be pressurized after completing the assembly to make sure that there are no air leaks, and the closure 30 is air tight.

A fiberoptic cable 54 may have a strength member (not shown) to prevent the cable 54 from bending too tightly. The fiber lines can be broken if they are bent too severely. Accordingly, some cables have a strength member (not shown)—such as a ¹/₁₆ inch diameter fiber glass rod, extending through the center. The strength member can expand and extend further into the closure 30 due to heat causing damage to the fibers located in the closure 30. To this end, the middle end cap portion 72 includes three strength member clamps 102, one for each cable entrance, to which the strength members are clamped.

As previously indicated, the tray holder 300 is secured to the bottom cover 44, and the splice trays 400 are inserted into the tray holder 300 such that the trays 400 extend longitudinally and vertically in a side-by-side relationship. In the illustrated embodiment, each splice tray 400 can hold up to 60 single or mass fusion splices. In other words, up to 60 single fibers or 60 twelve-count fiber ribbons from each of the two fiber bundles or ribbon bundles may enter the tray 400—a total of 120 single fibers or 120 twelve-count fiber ribbons. The illustrative closure 30 can hold up to 360 single fusion splices (60 single fusion splices per tray×6 splice trays), or up to 4320 mass fusion splices of twelve-count fiber ribbons (60 mass fusion splices per tray×12 fibers per mass fusion splice×6 splice trays).

To meet the Bellcore Lab's GR-771-CORE specification, the closure 30 must also provide space for 98 inches of slack fibers or ribbons. The slack fibers or ribbons are required in case of a bad splice or if damage would occur to the closure and/or splices. Once the splice is made and lines are strung on telephone poles for miles, there is no way of getting extra cable. Therefore, enough slack fibers must be provided at the outset to meet all future needs. Thus, the closure 30 must hold up to 98 inches of slack fibers for each of 720 fibers or 720 twelve-count ribbons entering the closure 30. Accordingly, the bottom cover 44 is dimensioned and sized such that there is sufficient storage space 50 around the perimeter of the tray holder 300 for the slack fibers or ribbons 322. In the illustrated embodiment, the width of the storage space 50 around the tray holder 300 is about 1.5 inches.

Figure 2:
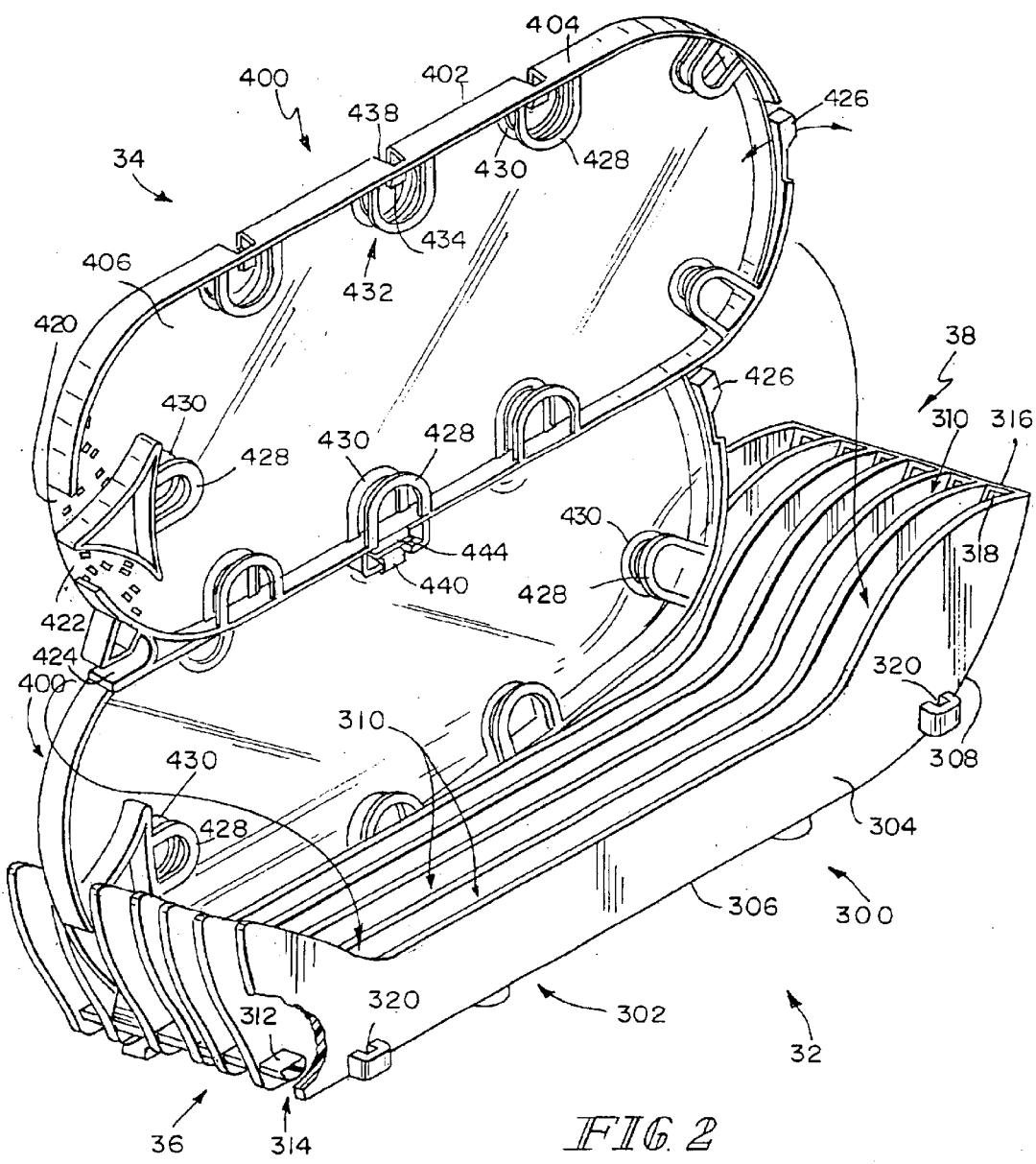
FIG. 2 is a perspective view of a tray holder, and showing a bottom wall configured to be coupled to the bottom cover, a plurality of longitudinally-extending sidewalls that extend upwardly from the bottom wall in perpendicular relation therewith to define a plurality of tray-receiving spaces, one splice tray partially inserted into a tray-receiving space, and a second splice tray ready to be inserted into another tray-receiving space.

Referring to FIGS. 2–4, the tray holder 300 includes a bottom wall 302 coupled to the bottom cover 44 and seven longitudinally-extending sidewalls 304 that extend upwardly from the bottom wall 302 in perpendicular relation therewith and with the upwardly-facing sealing surface 164 of the bottom cover 44. The bottom wall 302 of the tray holder 300 includes a flat portion 306 and an arcuate end portion 308 appended to the flat portion 306. Four screws (obscured) extend through the respective openings 328 in the flat portion 306 of the bottom wall 302 of the tray holder 300, and are threaded into four studs (obscured) in the bottom cover 44. When secured, the tray holder 300 is centered between the end caps 46, 48 of the closure 30, and the bottom wall 302 of the tray holder 300 is parallel to the sealing surface 164 of the bottom cover 44. The sidewalls 304 of the tray holder 300 are laterally spaced apart to define six tray-receiving spaces 310. It will be however understood that the tray holder 300 may very well be designed to form a larger or smaller number of tray-receiving spaces 310. A lower portion of a splice tray 400 is received in a tray-receiving space 310 when the splice tray 400 is inserted into the tray holder 300.

As shown in FIGS. 5 and 6, each splice tray 400 includes a base 402 having a perimetral wall 404 extending perpendicularly therefrom and a lid 406 releasably secured to the perimetral wall 404. The base 402, the perimetral wall 404 and the lid 406 form an interior region 408 for housing up to 60 single fusion or mass fusion splices. The perimetral wall 404 includes a flat top portion 410, a flat bottom portion 412, an arcuate left portion 414 and an arcuate right portion 416. The arcuate left portion 414 of the perimetral wall 404 is formed to include two fiber entry ports or entrances 420, 422 communicating with the interior region 408. Two sets of optical fibers or twelve-count ribbons enter the interior region 408 through the respective entrances 420, 422 in the perimetral wall 404. A first end 36 of the flat bottom portion 412 of the perimetral wall 404 is formed to include an outwardly-extending catch 424. The arcuate right portion 416 of the perimetral wall 404 is formed to include a flexible finger or latch 426. The catch 424 and the flexible finger 426 are formed at opposite ends 36, 38 of the splice tray 400. The perimetral wall 404 is additionally formed to include two sets of inwardly-extending laterally spaced-apart retention tabs 428, 430 along the inner periphery thereof defining nine fiber-receiving spaces 432 therebetween. The lid 406 includes three tabs 434 along a top edge 436 thereof that are configured to be received in three tab-receiving slots 438 in the flat top portion 410 of the perimetral wall 404. In addition, the lid 406 is formed to include a flexible finger or latch 440 along a bottom edge 442 thereof. The flat bottom portion 412 of the perimetral wall 404 is formed to include a bar 444 which is spaced apart from the flat bottom portion 412 of the perimetral wall 404 to define a finger-receiving space 446. The flexible finger 440 of the lid 406 is configured to be received in the finger-receiving space 446 and engage the bar 444 to releasably lock the lid 406 to the perimetral wall 404. The flexible finger 440 is movable between a locking position engaging the bar 444 to prevent decoupling of the lid 406 from the base 402 and a releasing position disengaged from the bar 444 to allow decoupling of the lid 406 from the base 402.

The flat bottom portion 412 of the perimetral wall 404 of a splice tray 400 is configured to abut the flat portion 306 of the bottom wall 302 of the tray holder 300 and the arcuate end portion 416 of the perimetral wall 404 of the splice tray 400 is configured to abut the arcuate end portion 308 of the bottom wall 302 of the tray holder 300 when a splice tray 400 is inserted into the tray holder 300. The tray holder 300 includes a first member or bar 312 extending between the sidewalls 304 adjacent to a first end 36 thereof which is spaced apart from the flat portion 306 of the bottom wall 302 of the tray holder 300 to define a catch-receiving space 314. The tray holder 300 includes a second member or bar 316 extending between the sidewalls 304 adjacent to a second end 38 thereof which is spaced apart from the flat portion 306 of the bottom wall 302 of the tray holder 300 to define a finger-receiving space 318. The bottom wall 302 of the tray holder 300 includes four holes 320, two on each side 32, 34 thereof, for securing the slack fibers 322 with cable ties 324.

Figure 8:
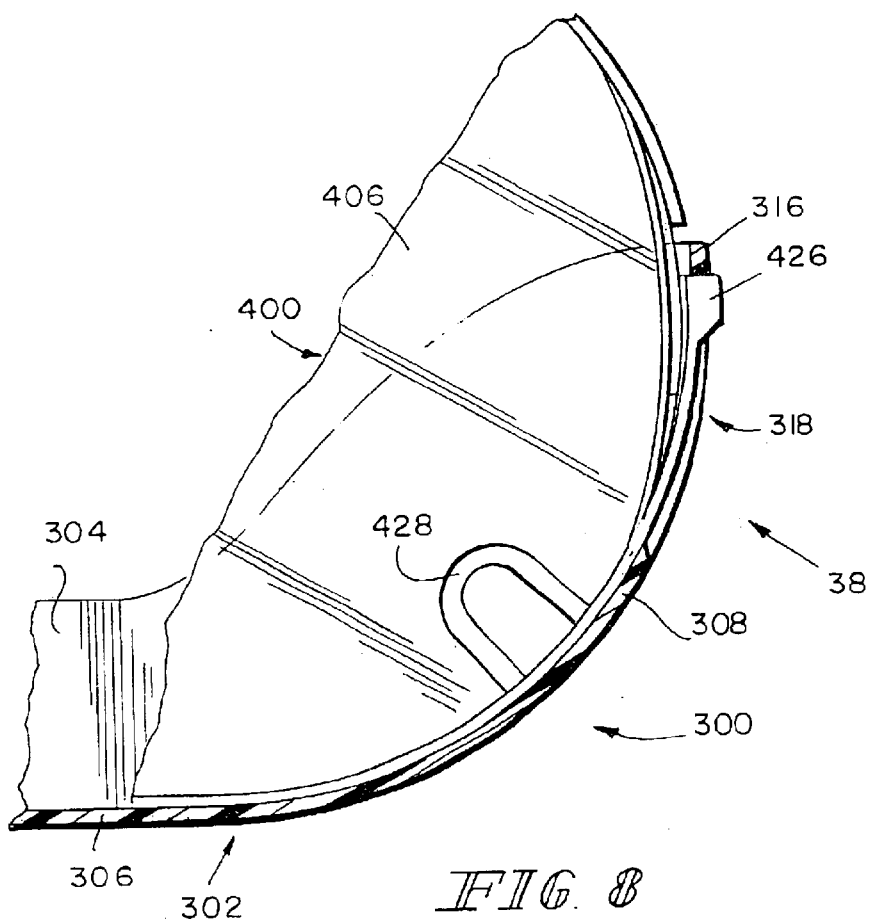
FIG. 8 is a front view, partly broken away, of the other end of the tray holder, and showing a splice tray inserted into the tray holder and a latch formed in the splice tray releasably received in a latch-receiving space formed in the tray holder.
Figure 7:
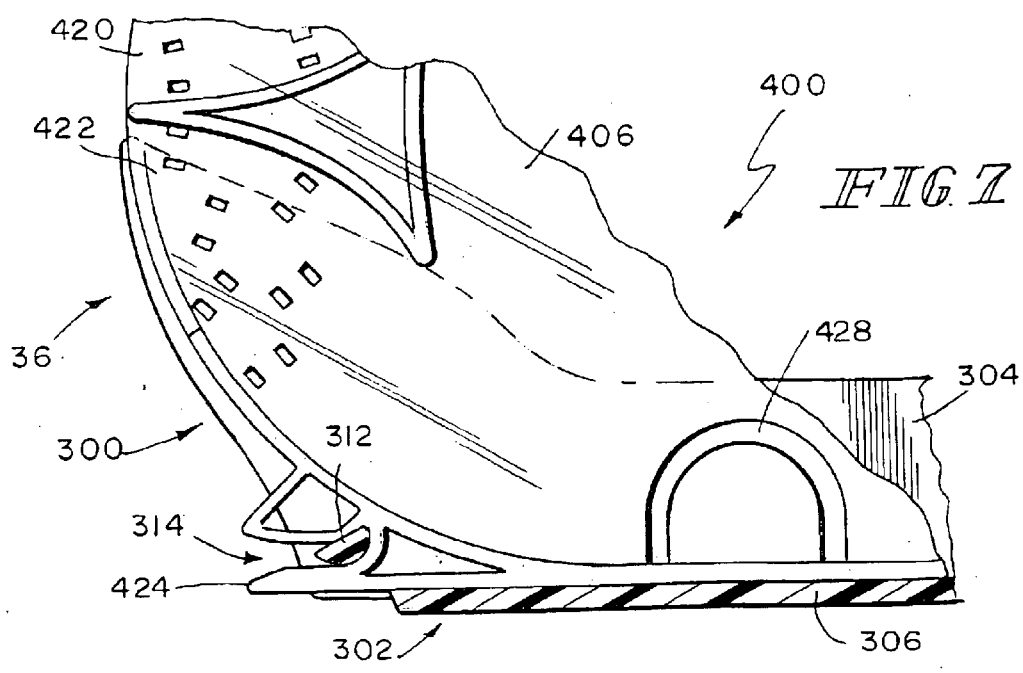
FIG. 7 is a front view, partly broken away, of one end of the tray holder, and showing a splice tray inserted into the tray holder and a catch formed in the splice tray releasably received in a catch-receiving space in the tray holder.

When the splice tray 400 is coupled to the tray holder 300, the catch 424 formed in the flat bottom portion 412 of the perimetral wall 404 of the splice tray 400 is received in the catch-receiving space 314 as shown in FIG. 7 and engages the first bar 312 adjacent to a first end 36 and the flexible finger 426 formed in the arcuate end portion 416 of the perimetral wall 404 of the splice tray 400 is received in the finger-receiving space 318 as shown in FIG. 8 and engages the second bar 316 adjacent to a second end 38. The flexible finger 426 is movable between a locking position engaging the second member 316 to prevent decoupling of the splice tray 400 from the tray holder 300 and a releasing position disengaged from the second member 316 to allow decoupling of the splice tray 400 from the tray holder 300. When secured to the tray holder 300, a first portion of the splice tray 400 is positioned to lie above the upwardly-facing sealing surface 164 of the bottom cover 44 and a second portion of the splice tray 400 is positioned to lie below the upwardly-facing sealing surface 164 of the bottom cover 44.

A typical sequence of steps required to complete the assembly of the splice closure 30 is as follows: 1) The cable sheath is cut in order to expose about 100 inches of fiber. 2) A bond connector is clamped onto the cable sheath. 3) The cable 54 is wrapped with the sizing tape. The technician uses a gauge provided with the closure 30 to ensure the correct size wrap. 4) The strength member is cut to the desired length. 5) The cable 54 is secured to the middle clamp 72 by a cable tie. 6) The strength member is secured to the strength member clamp 102 with a bonding clamp. 7) The steps 1–6 are repeated for each cable 54 in the first layer entering the closure 30. 8) Once three cables in the first layer are secured to the bottom side of the middle clamp 72, it is bolted down onto the bottom clamp 74. 9) If additional cables are required, steps 1–6 are followed for each cable 54 to secure the additional cables in the second layer to the top side of the middle clamp 72. Then the top clamp 70 is bolted to the middle and bottom clamps 72, 74. 10) The fibers are spliced and located into the desired trays 400. When the trays 400 are full (up to 60 splices), they are inserted into the tray holder 300 and the slack fibers 322 from the two cables 54 are laid around the perimeter of the tray holder 300. 11) Slack fibers 322 are secured to the tray holder 300 by cable ties 324. 12) All the cables 54 are grounded using a stainless wire braid. 13) The top cover 42 is bolted to the bottom cover 44 to complete the closure assembly. FIG. 9 is a top view of an assembled splice closure with the top cover removed.

Illustratively, the materials used for the splice closure 30 are as follows: 1) the top and bottom covers 42, 44—glass-filled polypropylene, 2) the tray holder 300—polycarbonate ABS blend, 3) the splice trays 400—polycarbonate ABS blend, 4) the sizing tape 56—Neoprene and 5) the gaskets 58—silicone-based rubber or Neoprene. Illustratively, the dimensions of the splice closure 30 are as follows: 1) the top cover 42—25 inches long×9 inches wide×4 inches high, 2) the bottom cover 44—29 inches long×9 inches wide×4 inches high, 3) the inside diameter of the closure 30—6.75 inches, 4) the tray holder 300—12 inches long×3.5 inches wide×3.25 inches high, 5) the splice trays 400—12 inches long×5.75 inches high×0.4375 inches wide and 6) the storage space 50 around the tray holder 300 for the slack fibers or ribbons 322—about 1.5 inches wide. Each splice tray 400 can hold up to 60 single or 60 mass fusion splices. In other words, up to 60 single fibers or 60 twelve-count fiber ribbons from each of the two fiber bundles or ribbon bundles may enter the tray 400, a total of 120 single fibers or 120 twelve-count fiber ribbons. The splice closure 30 can hold up to 360 single fusion splices (60 single fusion splices per tray×6 splice trays), or up to 4320 mass fusion splices of twelve-count fiber ribbons (60 mass fusion splices per tray×12 fibers per mass fusion splice×6 splice trays). The splice closure 30 is designed to hold up to 98 inches of slack fibers for each of 720 fibers or 720 twelve-count ribbons.

Although the present invention has been described in detail with reference to certain preferred embodiments, variations and modifications exist within the scope and spirit of the present invention as described above.

What is claimed is:

1. A splice closure for use with a plurality of splice trays, the splice closure comprising:

a bottom cover having a sealing surface, the bottom cover having a plurality of upwardly opening tray-receiving spaces configured to removably receive the trays and configured to allow removal of any tray from the bottom cover without disturbing other trays, and a top cover having a sealing surface, the sealing surface of the bottom cover abutting the sealing surface of the top cover when the two covers are mated to form an internal cavity.

2. A splice closure for use with a plurality of splice trays, the splice closure comprising:

a first component having a sealing surface, a second component having a sealing surface, the sealing surface of the first component abutting the sealing surface of the second component when the two components are mated to form an internal cavity, and a tray holder coupled to the first component, the tray holder having a plurality of tray-receiving spaces opening toward the sealing surface of the first component configured to removably receive the trays and configured to allow removal of any tray from the tray holder without disturbing other trays.

3. The splice closure of claim 2, wherein the first component is configured to form a storage space around the perimeter of the tray holder to store slack fibers.

4. The splice closure of claim 2, wherein the tray holder includes a latch-receiving space, wherein the splice tray includes a latch configured to be received in the latch-receiving space when the splice tray is inserted into the tray-receiving space to releasably secure the splice tray to the tray holder.

5. The splice closure of claim 4, wherein the latch comprises a flexible finger.

6. The splice closure of claim 4, wherein the tray holder includes a catch-receiving space on the side thereof opposite from the side having the latch-receiving space, wherein the splice tray includes a catch on the side thereof opposite from the side having the latch which is configured to be received in the catch-receiving space when the splice tray is inserted into the tray-receiving space to releasably secure the splice tray to the tray holder.

7. The splice closure of claim 2, wherein the splice tray comprises a base having a perimetral wall and a lid releasably secured to the perimetral wall to define an interior region, and wherein the perimetral wall includes at least one fiber entry port communicating with the interior region.

8. The splice closure of claim 7, wherein the perimetral wall includes a latch-receiving space, wherein the lid includes a latch configured to be received in the latch-receiving space when the lid is received by the perimetral wall to releasably secure the lid to the perimetral wall.

9. The splice closure of claim 8, wherein the latch comprises a flexible finger.

10. The splice closure of claim 8, wherein the perimetral wall includes a catch-receiving space on the side thereof opposite from the side having the latch-receiving space, wherein the lid includes at least one catch on the side thereof opposite from the side having the latch which is configured to be received in the catch-receiving space when the lid is received by the perimetral wall to releasably secure the lid to the perimetral wall.

11. The splice closure of claim 7, wherein the perimetral wall includes a plurality of inwardly-directed cable retention tabs along an edge thereof adjacent to the lid.

12. The splice closure of claim 11, wherein the perimetral wall includes a plurality of inwardly-directed cable retention tabs along an opposite edge thereof remote from the lid.

13. The splice closure of claim 2, wherein the tray-receiving spaces are arranged in a side-by-side relation to the tray holder.

14. The splice closure of claim 13, wherein the internal cavity is elongated, and wherein the tray-receiving spaces are laterally spaced and longitudinally extending.

15. The splice closure of claim 14, wherein the tray holder includes a latch-receiving space, wherein the splice tray includes a latch configured be received in the latch-receiving space when the splice tray is inserted into the tray-receiving space to releasably secure the splice tray to the tray holder.

16. The splice closure of claim 15, wherein the latch comprises a flexible finger.

17. The splice closure of claim 15, wherein the tray holder includes a catch-receiving space on the side thereof opposite from the side having the latch-receiving space, wherein each splice tray includes a catch on the side thereof opposite from the side having the latch which is configured to be received in the catch-receiving space when the splice tray is inserted into the channel to releasably secure the splice tray to the tray holder.

18. The splice closure of claim 2, including at least one end plate defining one end of the internal cavity, a first securing means and a second securing means separate from the first securing means, wherein the at least one end plate includes a first end plate portion, a removable second end plate portion and a removable third end plate portion, wherein the first end plate portion is integrally formed with the first component, wherein the first securing means is configured to secure the removable second end plate portion to the first end plate portion, and wherein the second securing means is configured to secure the removable third end plate portion to the first and second end plate portions.

19. The splice closure of claim 18, including a third securing means separate from the first and second securing means, wherein the third securing means secures the second component to the first component to form the internal cavity.

20. The splice closure of claim 18, wherein the first and second end plate portions are configured to form at least one cable entry port.

21. The splice closure of claim 18, wherein the second and third end plate portions are configured to form at least one cable entry port.

22. The splice closure of claim 2, wherein the splice closure has a length dimension, wherein the plurality of tray-receiving spaces are laterally spaced apart and extend along the length dimension of the splice closure.

23. The splice closure of claim 2, wherein the tray holder is integrally formed with the first component.

24. The splice closure of claim 2, wherein each component has an elongated semi-cylindrical configuration.

25. A splice closure for use with a splice tray, the splice closure comprising:
    an elongated housing having a pair of ends that are spaced apart longitudinally, the housing including a bottom cover that mates with a top cover along a longitudinal split plane to form an internal cavity, and
    a tray holder coupled to the bottom cover, the tray holder having an upwardly opening tray-receiving space configured to removably receive the tray, the tray holder including a latch-receiving space, the tray including a flexible latch, wherein the flexible latch is movable between a locking position where the flexible latch enters the latch-receiving space to prevent decoupling of the splice tray from the tray holder and a releasing position where the flexible latch is withdrawn from the latch-receiving space to allow decoupling of the splice tray from the tray holder.

26. The splice closure of claim 25, wherein the tray holder includes a bottom wall coupled to the bottom cover and a pair of longitudinally-extending sidewalls that extend upwardly from the bottom wall in perpendicular relation with the longitudinal split plane, wherein the holder sidewalls are laterally spaced apart to define the upwardly opening tray-receiving space therebetween, and wherein a portion of the splice tray is received in the tray-receiving space when the splice tray is coupled to the tray holder.

27. The splice closure of claim 26, wherein the tray holder includes a first member that extends between the holder sidewalls to define the latch-receiving space, wherein the tray holder includes a second member that extends between the holder sidewalls to define a catch-receiving space, and wherein the splice tray includes a catch that is received in the catch-receiving space in the tray holder when the tray is inserted into the tray-receiving space, reception of the latch in the latch-receiving space and the catch in the catch-receiving space releasably coupling the splice tray to the tray holder.

28. The splice closure of claim 27, wherein the latch is a flexible finger that is appended to a perimetral wall of the splice tray, and wherein the flexible finger is movable between a locking position engaging the first member to prevent decoupling of the splice tray from the tray holder and a releasing position disengaged from the first member to allow decoupling of the splice tray from the tray holder.

29. The splice closure of claim 27, wherein the catch is appended to a perimetral wall of the splice tray and extends outwardly therefrom.

30. The splice closure of claim 26, wherein the bottom wall of the tray holder includes a flat portion and an arcuate end portion appended to the flat portion, wherein the flat portion is parallel to the longitudinal split plane of the housing, and wherein a perimetral wall of the splice tray includes a first portion that abuts the flat portion of the bottom wall and a second portion that abuts the arcuate end portion of the bottom wall.

31. The splice closure of claim 30, wherein the arcuate end portion of the bottom wall is formed to include the latch-receiving space therein, and wherein the latch is coupled to the second portion of the perimetral wall.

32. The splice closure of claim 30, wherein the tray holder includes a member extending between the holder sidewalls, wherein the member is spaced apart from the flat portion of the bottom wall of the tray holder to define a catch-receiving space therebetween, wherein the splice tray includes a catch extending from the first portion of the perimetral wall, and wherein at least a portion of the catch is received in the catch-receiving space when the splice tray is coupled to the tray holder.

33. The splice closure of claim 25, wherein a first portion of the splice tray is positioned to lie on one side of the longitudinal split plane when the splice tray is coupled to the tray holder and a second portion of the splice tray is positioned to lie on another side of the longitudinal split plane when the splice tray is coupled to the tray holder.

34. The splice closure of claim 33, wherein the bottom cover has a pair of longitudinally-spaced endwalls and a sidewall extending longitudinally between the pair of endwalls, and wherein the tray holder is centered between the endwalls of the bottom cover.

35. The splice closure of claim 25, wherein the bottom cover has a pair of longitudinally-spaced endwalls and a sidewall extending longitudinally between the pair of endwalls, and wherein a perimetral wall of the splice tray includes a pair of longitudinally spaced-apart end portions that face toward respective endwalls of the bottom cover, and wherein at least one fiber entry port is formed in one of the end portions of the perimetral wall of the splice tray.

36. The splice closure of claim 35, wherein the latch is coupled to one of the end portions of the perimetral wall, the splice tray includes a catch coupled to the other of the end portions of the perimetral wall, and the tray holder is formed to include a catch-receiving space that is configured to receive the catch when the splice tray is inserted in the tray-receiving space, reception of the latch in the latch-receiving space and the catch in the catch-receiving space releasably coupling the splice tray to the tray holder.

37. The splice closure of claim 36, wherein the latch is a flexible finger and the catch is a rigid bar, the flexible finger has a first position preventing decoupling of the splice tray from the tray holder, and the flexible finger has a second position permitting decoupling of the splice tray from the tray holder.

38. The splice closure of claim 25, wherein at least one cable entry port is formed at a first end of the housing and at least one cable entry port is formed at a second end of the housing.

39. A splice closure for use with a splice tray, the splice closure comprising:
   a housing including a top cover that mates with a bottom cover to form an internal cavity having at least one cable entry port communicating therewith,
   a tray holder coupled to the bottom cover, and
   wherein the tray holder is formed to define a top opening tray-receiving space,
   wherein a portion of the splice tray is received in the tray-receiving space when the splice tray is inserted in the tray-receiving space,
   wherein the tray holder includes a latch-receiving space and a catch-receiving space,
   wherein the splice tray includes a latch and a catch that are configured to be received in the latch-receiving space and the catch-receiving space of the tray holder respectively when the splice tray is inserted in the tray-receiving space to removably couple the splice tray to the tray holder, and
   wherein at least one of the latch and the catch is flexible to allow removal of the splice tray from the tray holder.

40. The splice closure of claim 39, wherein the tray holder is integrally formed with the bottom cover.

41. The splice closure of claim 39, wherein the tray holder includes first and second members which are integrally formed with the tray holder and which define the latch receiving space and the catch receiving space respectively.

42. The splice closure of claim 41, wherein the latch and the catch are integrally formed with the splice tray.

43. The splice closure of claim 39, wherein the latch and the catch are integrally formed with the splice tray.

44. The splice closure of claim 39, wherein the top cover and bottom cover mate along a sealing surface to form the internal cavity, and wherein the splice tray extends substantially perpendicular to the sealing surface when the splice tray is coupled to tray holder.

45. The splice closure of claim 39, wherein the splice tray includes a pair of spaced-apart substantially planar sidewalls and a perimetral wall extending between the sidewalls to form an interior region, and wherein the perimetral wall is formed to include at least one cable entry port communicating with the interior region.

46. The splice closure of claim 45, wherein the latch is a flexible finger that is appended to the perimetral wall of the splice tray, and wherein the flexible finger is movable between a locking position where the flexible finger enters the latch-receiving space to prevent decoupling of the splice tray from the tray holder and a releasing position where the flexible finger is withdrawn from the latch-receiving space to allow decoupling of the splice tray from the tray holder.

47. The splice closure of claim 45, wherein the catch is appended to the perimteral wall of the splice tray and extending therefrom.

48. The splice closure of claim 45, wherein the tray holder includes a bottom wall coupled to the bottom cover and a pair of opposed sidewalls extending upwardly from the bottom wall in perpendicular relation therewith to define the tray-receiving space, and wherein a portion of the splice tray is received in the tray-receiving space when the splice tray is coupled to the tray holder.

49. The splice closure of claim 48, wherein the bottom wall of the tray holder includes a flat portion coupled to the bottom cover and an arcuate end portion appended to the flat portion, and wherein the perimetral wall of the splice tray includes a first portion that abuts the flat portion of the bottom wall and a second portion that abuts the arcuate end portion of the bottom wall.

50. The splice closure of claim 49, wherein the arcuate end portion of the bottom wall is formed to include the latch-receiving space therein, wherein the latch is coupled to the second portion of the perimetral wall, and wherein the latch is received in the latch-receiving space when the splice tray is coupled to the tray holder.

51. The splice closure of claim 50, wherein the tray holder includes a member extending between the holder sidewalls, wherein the member is spaced apart from the flat portion of the bottom wall of the tray holder to define the catch-receiving space therebetween, wherein the catch extends from the first portion of the perimetral wall, and wherein at least a portion of the catch is received in the catch-receiving space when the splice tray is coupled to the tray holder.

52. A splice closure comprising:
- a top cover,
- a bottom cover,
- at least one end plate,
- the at least one end plate including a first end plate portion, a removable second end plate portion and a removable third end plate portion, the first end plate portion being integrally formed with the bottom cover,
- a first securing means for securing the removable second end plate portion to the first end plate portion,
- a second securing means separate from the first securing means for securing the removable third end plate portion to the first and second end plate portions,
- a third securing means separate from the first and second securing means for securing the top cover to the bottom cover to form the splice closure.

53. A splice tray for use with a splice closure including a top cover, a bottom cover, a tray holder coupled to the bottom cover, the tray holder having a latch-receiving space and a top opening tray-receiving space for removably receiving the tray, the splice tray comprising:
- a base, and
- a lid releasably secured to the base to define an interior region
- the base including a flexible latch, the flexible latch being movable between a locking position where the flexible latch enters the latch-receiving space in the tray holder to prevent decoupling of the splice tray from the tray holder and a releasing position where the flexible latch is withdrawn from the latch-receiving space in the tray holder to allow decoupling of the splice tray from the tray holder.

54. The splice tray of claim 53, wherein the tray holder has a catch-receiving space spaced apart from the latch-receiving space, and the base of the splice tray includes a rigid catch that is received in the catch-receiving space, reception of the latch in the latch-receiving space and the catch in the catch-receiving space releasably securing the splice tray to the tray holder.

* * * * *